(12) United States Patent
Bartscher et al.

(10) Patent No.: US 9,158,028 B2
(45) Date of Patent: Oct. 13, 2015

(54) FACILITY FOR INSPECTING LARGE-VOLUME GOODS, IN PARTICULAR FREIGHT GOODS

(71) Applicant: Smiths Heimann GmbH, Wiesbaden (DE)

(72) Inventors: Bernd Bartscher, Wiesbaden (DE); Andreas Frank, Wiesbaden (DE); Rainer Henkel, Schweppenhausen (DE); Claus Meder, Rossdorf (DE)

(73) Assignee: Smiths Heimann GmbH, Wiesbaden (DE)

(*) Notice: Subject to any disclaimer, the term of this patent is extended or adjusted under 35 U.S.C. 154(b) by 70 days.

(21) Appl. No.: 14/027,534

(22) Filed: Sep. 16, 2013

(65) Prior Publication Data
US 2014/0016746 A1   Jan. 16, 2014

Related U.S. Application Data

(63) Continuation of application No. PCT/EP2012/053331, filed on Feb. 28, 2012.

(30) Foreign Application Priority Data

Mar. 14, 2011   (DE) .......................... 10 2011 013 942

(51) Int. Cl.
  *G01V 5/00*   (2006.01)
(52) U.S. Cl.
  CPC .................................. *G01V 5/0016* (2013.01)

(58) Field of Classification Search
  CPC . G01V 5/0008; G01V 5/0016; G01V 5/0066; G01V 5/0025
  See application file for complete search history.

(56) References Cited

U.S. PATENT DOCUMENTS

| | | | |
|---|---|---|---|
| 4,884,289 A | 11/1989 | Glockmann et al. | |
| 7,308,076 B2 | 12/2007 | Studer et al. | |
| 2005/0089140 A1 | 4/2005 | Mario et al. | |
| 2008/0025464 A1* | 1/2008 | Foland et al. | 378/57 |
| 2008/0298546 A1 | 12/2008 | Bueno et al. | |
| 2011/0038453 A1 | 2/2011 | Morton et al. | |

FOREIGN PATENT DOCUMENTS

| | | |
|---|---|---|
| DE | 101 22 279 A1 | 12/2002 |
| EP | 0 247 491 A1 | 12/1987 |
| WO | WO 99/08132 A1 | 2/1999 |
| WO | WO 2009/106803 A2 | 9/2009 |

* cited by examiner

*Primary Examiner* — Hoon Song
(74) *Attorney, Agent, or Firm* — Muncy, Geissler, Olds & Lowe, P.C.

(57) ABSTRACT

In a facility for checking large-volume goods, in particular freight goods, with an X-ray source, which emits X-rays for irradiating the goods, and with a detector arrangement aligned with the X-ray source, the detectors of the detector arrangement are designed or arranged in such a way that detector rows are produced with two row limbs which abut one another at right angles on their longitudinal sides, of which one limb is aligned parallel to the movement direction of the goods being checked, and the other is aligned perpendicular to this in the direction of the X-ray source.

14 Claims, 2 Drawing Sheets

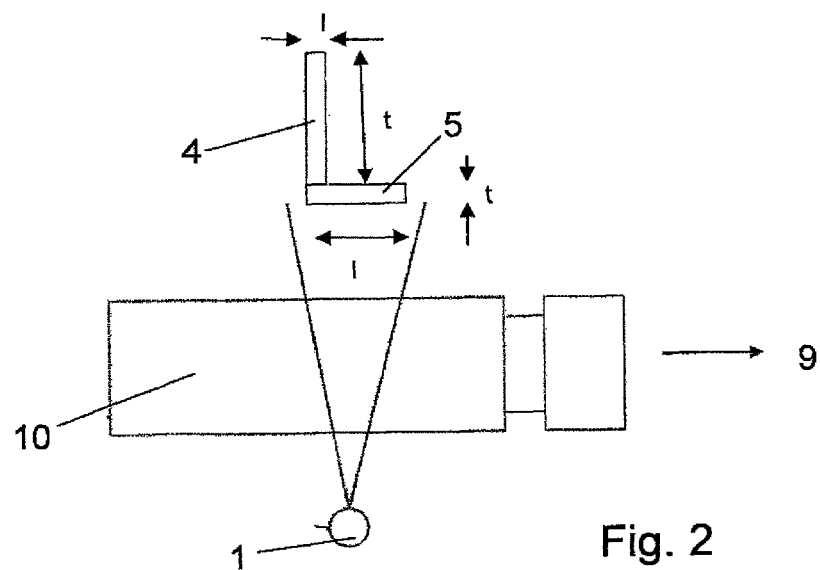
Fig. 2
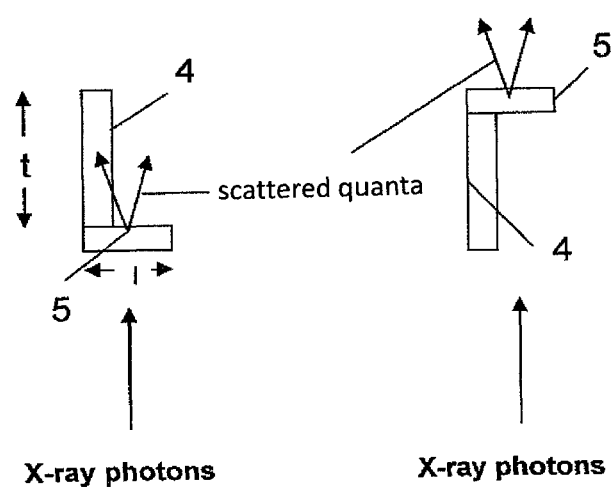
Fig. 3                                                    Fig. 4

FACILITY FOR INSPECTING LARGE-VOLUME GOODS, IN PARTICULAR FREIGHT GOODS

This nonprovisional application is a continuation of International Application No. PCT/EP2012/053331, which was filed on Feb. 28, 2012, and which claims priority to German Patent Application No. DE 10 2011 013 942.7, which was filed in Germany on Mar. 14, 2011, and which are both herein incorporated by reference.

BACKGROUND OF THE INVENTION

1. Field of the Invention

The present invention relates to a system for inspecting large-volume goods, in particular freight goods, with an x-ray source, which emits x-rays for irradiating the goods, and with a detector arrangement aligned with the x-ray source.

2. Description of the Background Art

As is generally known, x-ray systems, which have an x-ray source and a detector arrangement aligned with the x-ray source, are employed to inspect large-volume freight goods such as truck or container loads. While the goods to be inspected are moved between the x-ray source and the detector arrangement relative to these, they are irradiated by x-rays and scanned in addition. For the relative movement between the inspection system and the inspection goods, either the inspection goods themselves, for example, a truck, move between the x-ray source and the detector arrangement, or the inspection system has its own drive by which it is moved relative to the inspection goods.

To inspect the inspection goods in a scanning process, it is known to arrange the detectors in the detector arrangement in corresponding detector rows. As described in DE 101 22 279 A, which corresponds to U.S. Pat. No. 7,308,076, and which is incorporated herein by reference, the detector arrangement contains two detector rows at right angles to one another, one of which extends vertically upwards and the other horizontally above the inspection track.

Cargo scanning systems use mainly cesium iodide (CsI) scintillators for detecting transmitted x-rays. Ceramic scintillators are employed in part in baggage inspection systems. This has not been the case so far in freight scanning systems, because due to the large inspection surface and the huge number of required crystals the cost of the detectors would represent too great a share of the manufacturing costs.

High energy x-rays of, for example, 3.5 to 4 MeV are used to penetrate trucks and containers. The x-rays are generated by pulsed electron accelerators. Detectors with a specific depth are needed because of the high energies. The depth is measured here in the direction of the x-ray source and thereby perpendicular to the direction of movement of the inspection goods.

At higher relative speeds of the inspection goods it is difficult to generate good images without stripes, because to accomplish this the relative speed must be matched to the pulse rate dependent on detector dimensions.

In freight inspection systems, an increasingly better image resolution and a higher penetration are required. These can be achieved by improvements in the x-ray source and the detectors.

SUMMARY OF THE INVENTION

It is therefore an object of the present invention to provide a system for inspecting large-volume goods, in particular freight goods, which provides complete images with an improved quality at a higher relative speed of the inspection goods.

This object is attained according to an embodiment of the invention in that the detectors of the detector arrangement are designed or arranged so that detector rows form with two row legs abutting at right angles on their long sides, of which one leg is oriented parallel to direction of movement of the inspection goods and the other is oriented perpendicular thereto in the direction of the x-ray source.

Preferably, the leg oriented parallel to the direction of movement is arranged in front in the direction of the x-rays, therefore closer to the x-ray source.

Preferably, the detectors contain as the scintillation material gadolinium oxysulfide (GOS), which is preferably doped with cerium ($Gd_2O_2S:Ce$). Alternatively, cadmium tungstate ($CdWO_4$) is used as the scintillation material.

GOS as a scintillation material has a number of advantages compared with CsI. Because it has a higher density and a higher $Z_{eff}$, it is especially suitable for detecting photons above 100 keV. Furthermore, it is not hygroscopic. Nevertheless, the material is not transparent to the emitted scintillation photons. This limits the use in the direction of higher energies, because the scintillation photons of the entire crystals can no longer be collected.

Cadmium tungstate as an alternative scintillation material also has advantages in regard to absorption and afterglow. In addition, cadmium tungstate crystals are transparent to scintillation photons. For this reason, there is less restriction in crystal size. Nevertheless, the light yield of cadmium tungstate per photon is much lower than the yield of GOS, which is also superior in regard to environmental and health protection.

Properties of different scintillators are listed in the following Table 1.

TABLE 1

Properties of Different Scintillators ($\lambda_{max}$: wavelength of the maximum of the distribution of scintillation photons)

| Scintillator | P [g/cm$^{-3}$] | Afterglow | $\lambda_{max}$ [nm] | $Z_{eff}$ | Hygroscopic |
|---|---|---|---|---|---|
| CsI | 4.51 | <1% @ 100 ms | 310 | 54 | Yes |
| $Gd_2O_2S:Ce$ | 7.34 | <0.02% @ 3.5 ms | 580 | 61.1 | No |
| $CdWO_4$ | 7.9 | <0.1% @ 3 ms | 495 | 64.2 | No |

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 illustrates a structure of an inspection system according to an embodiment; and FIGS. 3 and 4 illustrate detector rows according to an embodiment.

DETAILED DESCRIPTION

Figure 1:
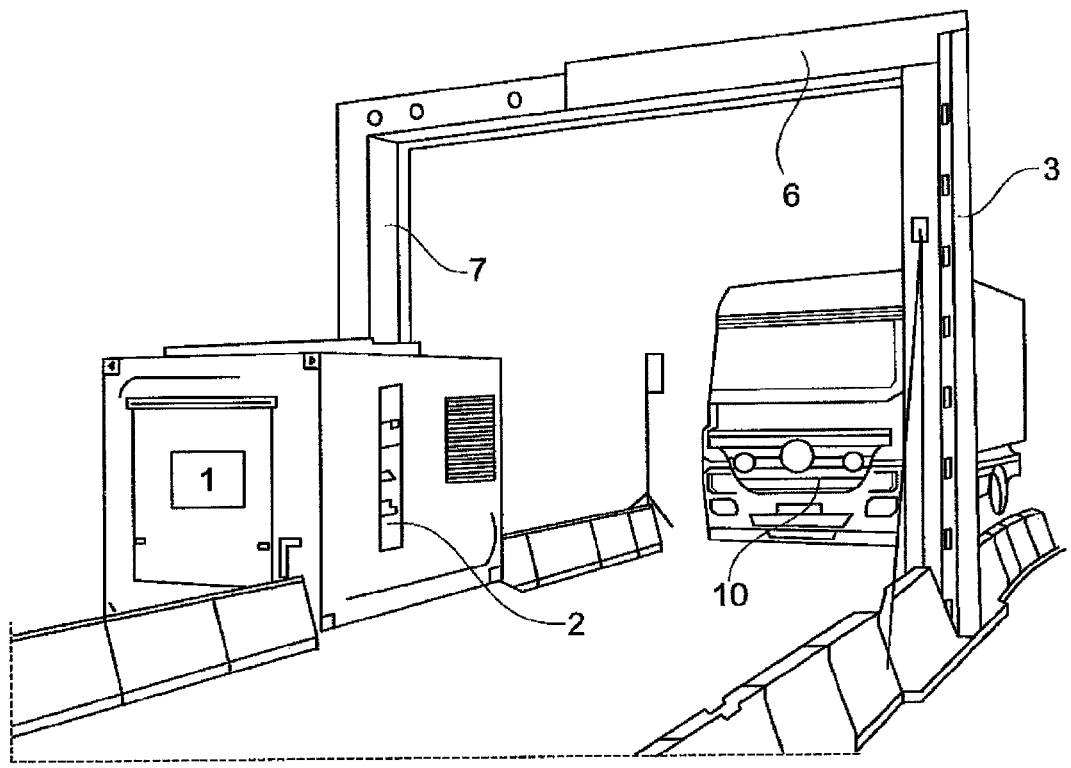
FIG. 1 illustrates a facility for inspecting large-volume goods according to an embodiment of the invention.

An x-ray source is arranged in a housing 1. The x-rays are generated by an electron accelerator with an energy between 3.5 and 4 MeV and leave through an aperture 2 in housing 1. A vertical detector row 3, which is made up of individual detectors 4, 5, is located at a distance from housing 1. Another horizontal detector row 6, which is supported by another vertical detector row 7 on housing 1, runs at the upper end of vertical detector row 3. There is a sufficiently large free space, through which large-volume goods such as a truck 10 or a standard freight container can be moved in the direction of arrow 9 for inspection, between housing 1 and detector rows 3, 6, 7.

As shown in FIGS. 3 and 4, each detector row 3, 6, 7 has two row legs, abutting at right angles on their long sides and each formed by detectors 4, 5 arranged next to one another or above one another. One of the legs is oriented parallel to the direction of movement 9 of the inspection goods (in the example the leg formed by detectors 5). The other leg, formed in the example by detectors 4, is oriented perpendicular thereto in the direction of x-ray source 2. The length I, measured in the direction of movement 9, of detectors 5, oriented in the direction of movement 9, is about 10 mm; its measured depth t perpendicular thereto is about 5 mm. The correspondingly measured length I of detectors 4, arranged perpendicular thereto, is about 5 mm. Their depth t is about 20 mm to 30 mm.

Preferably, leg 5, oriented parallel to the direction of movement 9 of the inspection goods, is arranged in front in the direction of the x-rays, therefore closer to x-ray source 1, as is shown in FIGS. 2 and 3. Then, photons with a higher energy scattered in the forward direction by the Compton effect are also detected in the other detectors 4.

The other variant, shown in FIG. 4, in which leg 5, oriented parallel to the direction of movement 9 of the inspection goods, is arranged in back in the direction of the x-rays, therefore farther away from x-ray source 1, has advantages in regard to the resolution of finer structures, because less crosstalk between the channels can occur.

The detector rows with angled legs can be produced, for example, such that an additional thin GOS scintillator bar, which increases the detector width in the direction of movement 9, is glued onto a detector, for example, of GOS, arranged in a standard manner.

The following Table 2 shows parameters, which were obtained using a standard test for the different detector rows.

TABLE 2

Parameters obtained for the different detection rows using the penetration test tool and a test tool according to ANSI Standard 42.46.

| Parameter | Truck Speed | GOS | CsI |
|---|---|---|---|
| Steel Penetration | ~1 m/sec | 24 cm | 20 cm |
| Min Wire Resolution | ~1 m/sec | 3 mm | 3 mm |
| Min Hole Resolution | ~1 m/sec | 4 mm (10 mm plate) | 4 mm (10 mm plate) |

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system for inspecting large-volume goods, the system comprising:
    an x-ray source, which emits x-rays for irradiating the goods; and
    a detector arrangement aligned with the x-ray source and having detector rows of detectors, wherein the detector arrangement is arranged so that the detectors of each respective detector row form two legs abutting at right angles on their long sides, of which one leg is oriented parallel to the direction of movement of the inspection goods and the other leg is oriented substantially perpendicular thereto in a direction of the x-ray source.

2. The system according to claim 1, wherein the leg, oriented parallel to the direction of movement, is arranged in front in the direction of the x-rays, therefore closer to the x-ray source.

3. The system according to claim 1, wherein the leg, oriented parallel to the direction of movement, is arranged in back in the direction of the x-rays, therefore farther away from the x-ray source.

4. The system according to claim 1, wherein the detectors contain a scintillation material, and wherein the scintillation material is a gadolinium oxysulfide, which is doped with cerium.

5. The system according to claim 1, wherein the detectors contain a scintillation material, and wherein the scintillation material is cadmium tungstate.

6. An apparatus for inspecting freight goods, the device comprising:
    an x-ray source which emits x-rays towards the goods; and
    a first detector arrangement positioned opposite the x-ray source, the first detector arrangement comprising a first detecting leg and a second detecting leg which abut at right angles, wherein the first leg is oriented parallel to the direction of movement of the inspection goods and substantially perpendicular to the x-ray beam, and wherein the second leg is oriented perpendicular to the direction of movement of the inspection goods and parallel to the x-ray beam.

7. The apparatus of claim 6, wherein the first leg is positioned in front of the second leg relative to the incoming x-ray beam.

8. The apparatus of claim 7, wherein the first leg receives the x-ray beam first and scatters high energy photons to be received by the second leg.

9. The apparatus of claim 6, further comprising a second detector arrangement and a third detector arrangement, wherein the first detector arrangement is placed on an opposing side of the inspection goods as the x-ray source, the second detector arrangement is placed above the inspection goods and the third detector arrangement is placed on a same side of the inspection goods as the x-ray source.

10. A device for inspecting freight goods, the device comprising:
    an x-ray source which emits x-rays towards the goods; and
    a vertical detector arrangement comprising a first detector and a second detector each longer in height than in width or length and abutting at right angles along their long sides, wherein the first detector is oriented parallel to the direction of movement of the inspection goods and substantially perpendicular to the x-ray beam, and wherein the second detector is oriented perpendicular to the direction of movement of the inspection goods and parallel to the x-ray beam.

11. The device according to claim 10, wherein the first detector is positioned in front of the second detector relative to the incoming x-ray beam.

12. The device according to claim 11, wherein the first detector receives the x-ray beam first and scatters high energy photons to be received by the second detector.

13. The device according to claim 10, wherein the detectors contain a scintillation material, and
    wherein the scintillation material is a gadolinium oxysulfide, which is doped with cerium.

14. The system according to claim 10, wherein the detectors contain a scintillation material, and
    wherein the scintillation material is cadmium tungstate.

* * * * *